(12) United States Patent
Vagt et al.

(10) Patent No.: US 8,926,879 B2
(45) Date of Patent: Jan. 6, 2015

(54) METHOD FOR THE PRODUCTION OF HEAVILY INCLINED SURFACES IN LAYERS

(75) Inventors: Carsten Vagt, Oyten (DE); Ralf Wehning, Grasberg (DE)

(73) Assignee: Bego Medical GmbH, Bremen (DE)

( * ) Notice: Subject to any disclaimer, the term of this patent is extended or adjusted under 35 U.S.C. 154(b) by 423 days.

(21) Appl. No.: 13/003,548

(22) PCT Filed: Jul. 2, 2009

(86) PCT No.: PCT/EP2009/058370
§ 371 (c)(1),
(2), (4) Date: Mar. 11, 2011

(87) PCT Pub. No.: WO2010/003883
PCT Pub. Date: Jan. 14, 2010

(65) Prior Publication Data
US 2011/0180971 A1    Jul. 28, 2011

(30) Foreign Application Priority Data
Jul. 8, 2008 (DE) .......................... 10 2008 031 926

(51) Int. Cl.
*B29C 37/02* (2006.01)
*B29C 41/02* (2006.01)
*B29C 67/00* (2006.01)
*B22F 3/105* (2006.01)
*B22F 3/24* (2006.01)

(52) U.S. Cl.
CPC ......... *B29C 67/0088* (2013.01); *B29C 67/0092* (2013.01); *B29C 67/0062* (2013.01); *B22F 3/1055* (2013.01); *B22F 2003/247* (2013.01); *B22F 2998/00* (2013.01); *B29C 2793/009* (2013.01); *B22F 2003/1057* (2013.01)
USPC ............................ 264/161; 264/162; 264/308

(58) Field of Classification Search
USPC ......... 264/113, 161, 162, 163, 308, 401, 460, 264/463, 497
See application file for complete search history.

(56) References Cited

U.S. PATENT DOCUMENTS 6,682,684 B1 * 1/2004 Jamalabad et al. ........... 264/308
2004/0021256 A1 * 2/2004 DeGrange et al. ............ 264/497
(Continued)

FOREIGN PATENT DOCUMENTS

| DE | 103 20 085 A1 | 2/2004 |
| DE | 102 19 983 B4 | 3/2004 |

(Continued)

OTHER PUBLICATIONS

The International Search Report for Application No. PCT/EP2009/058370, dated Mar. 5, 2010, 15 pages.

(Continued)

*Primary Examiner* — Leo B Tentoni
(74) *Attorney, Agent, or Firm* — Kilpatrick Townsend and Stockton LLP

(57) ABSTRACT

The invention relates to a method for manufacturing a product in layers, said method comprising the following steps: (a) applying a layer of a curable material, (b) selectively curing predetermined zones of the applied layer on the basis of geometrical data of the product, (c) repeating steps (a) and (b) until the geometry of the product has been created in the form of cured material and (d) removing the uncured material. According to the invention, a finish allowance, for example one with a wedge-shaped cross-section, is applied in steps (a) and (b), in one, two or more product sections in which an angle ($\alpha$) between an axis perpendicular to the layers and at least one surface section of a contour of the product exceeds a predetermined value, to said surface section in such a way that the angle ($\beta$) between the axis perpendicular to the layers and the external surface in said product section does not exceed said predetermined value.

9 Claims, 2 Drawing Sheets

(56) References Cited

U.S. PATENT DOCUMENTS

Figure 1:
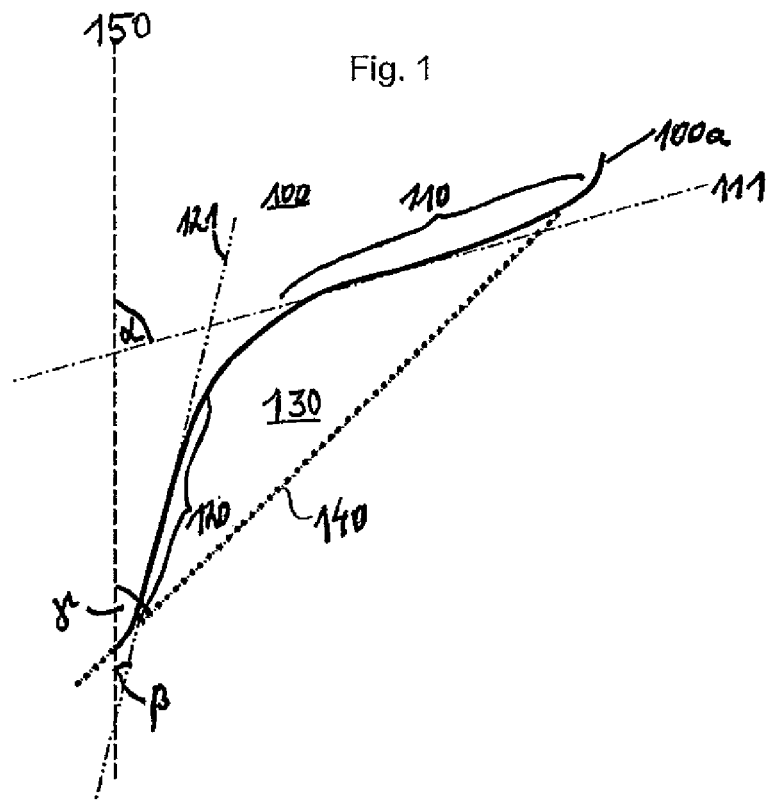

| | | | |
|---|---|---|---|
| 2005/0029711 A1* | 2/2005 | Abe et al. ................. | 264/497 |
| 2006/0131770 A1* | 6/2006 | Dierkes et al. ............ | 264/308 X |
| 2007/0173967 A1 | 7/2007 | Kritchman et al. | |

FOREIGN PATENT DOCUMENTS

| | | |
|---|---|---|
| DE | 299 24 924 U1 | 12/2006 |
| DE | 10 2005 050 665 A1 | 4/2007 |
| EP | 1 021 997 B1 | 7/2000 |
| EP | 1 348 506 A2 | 10/2003 |
| EP | 1 358 855 A1 | 11/2003 |
| EP | 1 568 472 B1 | 4/2007 |
| EP | 1 464 298 B1 | 5/2007 |
| EP | 1 925 428 A1 | 5/2008 |
| JP | 63 141725 A | 6/1988 |
| WO | WO 03-045669 A1 | 6/2003 |
| WO | WO 2005-080029 A1 | 9/2005 |

OTHER PUBLICATIONS

The Written Opinion for Application No. PCT/EP2009/058370, dated Jun. 7, 2010, 18 pages.

The International Preliminary Examination Report for Application No. PCT/EP2009/058370, dated Aug. 19, 2010, 5 pages.

* cited by examiner

METHOD FOR THE PRODUCTION OF HEAVILY INCLINED SURFACES IN LAYERS

CROSS-REFERENCE TO RELATED APPLICATIONS

This application is a National Stage of International Application No. PCT/EP2009/058370, filed Jul. 2, 2009, which claims the benefit of priority to German Application No. 10 2008 031 926.0, filed Jul. 8, 2008 the disclosures of each are herein incorporated by reference.

The invention relates to a method for manufacturing a product in layers, said method comprising the following steps: (a) applying a layer of a curable material, (b) selectively curing predetermined zones of the applied layer on the basis of geometrical data of the product, (c) repeating steps (a) and (b) until the geometry of the product has been created in the form of cured material and (d) removing the uncured material.

The invention also relates to a device for manufacturing a product by applying material in layers, comprising means for applying a layer of a curable material to a base plate and means for selectively curing predetermined zones of the applied layer on the basis of geometrical data of the product.

Methods and devices for manufacturing a product by applying material in layers are known, for example, from DE 299 24 924 U1, EP 1 021 997 B1, DE 102 19 983 B4, DE 103 20 085 A1, EP 1 464 298 B1, WO 2005/080029 A1, EP 1 568 472 B1 and DE 10 2005 050 665 A1. Methods of this kind allow geometrically complex products to be manufactured efficiently. Methods of the kind initially specified are known from "rapid prototyping", for example, in which a product model that can be used for demonstration and testing is made directly from product geometry data which describe the three-dimensional shape of the product.

Such methods may be carried out, for example, with a powdery or other free-flowing material which preferably can be hardened by a physical bonding process, for example fusion or sintering, and in this way can produce a resilient three-dimensional structure. Preferred methods include selective laser sintering (SLS), for example, or selective laser melting (SLM).

The method initially mentioned is also used, for example, for highly stressed products with complex geometries, such as those used, for example, as tooth replacements, implants or auxiliary dental parts in dental technology. For products to be used in dental technology, the selective laser melting (SLM) method is preferentially used for applying material in layers.

When laser sintering or laser melting, it is important that every region covered by the beam is brought to the melting point of the material to be cured, but without exceeding the vaporization point, since otherwise the material in that region would vaporize. When manufacturing products with small dimensions, in particular, such as those required in dental technology in the form of tooth replacements and auxiliary dental parts, for example, another difficulty arises from the fact that the products may have considerably different configurations of areas in the successive layers. For example, the size of the area may vary considerably over the height of the product, as a result of which the powdery material may overheat or be insufficiently melted. One particular disadvantage is that temperatures may be too high or too low when layers of material are applied to form the product, and that flaws in the product being manufactured and hence low-quality product may ensue.

Particularly in those product sections that during the manufacturing process have contours slanting away from the vertical, a new layer to be applied sometimes extends into a region below which there is no section of the product being made. I.e., the new layer to be cured projects laterally beyond the previously cured layer. The more the contour of a product section slants, i.e. the greater the angle between an axis perpendicular to the layers and a surface section of a contour of the product, the larger are also those sections of the layers being applied that project laterally beyond the previously manufactured layers.

In peripheral regions of products made by SLM, surface irregularities and flaws often occur. These intensify the more the peripheral region slants away from the vertical.

Performing very precise temperature control in general, and especially in the peripheral regions, firstly to ensure a sufficiently high temperature that exceeds the melting point of the material to be cured and secondly to ensure that the temperature does not become so high that the material being cured vaporizes, is known from the prior art.

Existing methods are therefore aimed at improving energy input control, thus facilitating temperature control as well. DE 103 20 085 A1 specifies a method in which the boundary conditions of the sintering or melting process, namely the energy density of the laser beam and/or its deflection velocity and/or the track pitch and/or the stripe width (perpendicular to the track direction) are automatically changed, depending on the procedure for sintering or melting. In this way, the energy yield is automatically adjusted to the amount of melting heat required, which can be predetermined in order to achieve the desired density of the finished product.

In the method according to EP 1 568 472 B1, the laser beam is controlled in such a way that the energy is coupled in a series of steps into the material or the material to be cured. In the first step, the energy is coupled into a certain position in the layer of material until the respective portion of the layer at said position has been heated to a temperature just below its melting point. In the final step of coupling in energy, the laser beam then heats said portion above its melting point, thereby fusing the material to the layer below it. The solution according to EP 1 568 472 B1 thus involves irradiating each position several times in order to manufacture the product. By means of such alternating irradiation, these temperature equalization processes may be carried out after an irradiation step has temporarily ended and another irradiation step is started or continued elsewhere. The risk of explosive vaporization of small particles of material is considerably reduced by directing the beam to a different position after a short period.

WO 2005/080029 A1 likewise pursues the aim of improving the product quality and the dimensional accuracy of the surface, in particular of thin-walled products, by adapting the wall thicknesses in such a way that the desired external contours of the product can be manufactured as precisely as possible by application of material in layers. To this end, WO 2005/080029 A1 discloses a method of the kind initially specified, in which a compensation data set and/or a compensation function is determined and linked to the product target geometry data set in order to produce a control data set by means of which a high-energy beam is guided during sintering and/or melting. By means of the compensation data set and/or the compensation function, the thickness of the product being manufactured is reduced in a plane which is perpendicular to a plane lying tangential to the external surface of the product. This is intended to reduce the effect of spherical irregularities that are observed when a new layer to be applied extends into a region under which there is no portion of the product being manufactured.

However, it has been shown that the aforementioned methods are inadequate with regard to product quality, in particular with regard to flaws in the cured material, and that they can be further improved. It is also possible to achieve further improvements in the surface quality of the products made, particularly in regions with complex geometries and different surface configurations in successive layers. The complex control of existing methods can likewise be further simplified.

The object of the invention is to provide a method and a device with which the production quality of products formed by layer application of material in a variety of different geometries can be improved.

This object is achieved, according to the invention, by a method of the kind initially specified, in which a finish allowance, for example one with a wedge-shaped cross-section, is applied in steps (a) and (b), in one, two or more product sections in which an angle ($\alpha$) between an axis perpendicular to the layers and at least one surface section of a contour of the product exceeds a predetermined value, to said surface section in such a way that the angle ($\beta$) between the axis perpendicular to the layers and the external surface in said product section does not exceed said predetermined value.

The invention is based on the realization that when curing a material, for example during laser melting, the zone to be cured is heated beyond the melting point of the material and that an equalization of temperature occurs via the previously cured layer under it, with the result, for example, that local temperature peaks which might cause the material to vaporize and which might therefore result in flaws in the product are prevented or reduced. In those regions in which the zones to be cured project laterally well beyond the previously cured zones, such temperature equalization is either not possible or difficult to achieve. In those zones, especially, there are difficulties, therefore, in achieving optimal temperature control, so there is a risk of flaws forming in the product being manufactured.

In contrast to prior art solutions, the solution according to the invention deviates in a systematic and predetermined manner from the desired product contour, when manufacturing in layers, by producing an SLM production contour in zones in which dimensional inaccuracies or quality problems may arise, particularly with regard to correct curing of the material. The SLM production contour is the sum of the product contour and a predetermined finish allowance. A finish allowance within the meaning of this description and the claims is a material that is applied as a manufacturing aid to the volume of material of the actual product and which is removed in a subsequent step to produce the product.

According to the invention, this is done by increasing the zones to be cured in the respective layers in such a way that a new layer to be cured extends by only a specific allowance beyond the previously produced layer below it. The predetermined finish allowance prevents the angle between the axis perpendicular to the layers and the individual surface sections of the SLM manufacturing contours from exceeding a predetermined value, thus preventing flaws such as only partially cured product portions, melt balls, cavities, etc., by the local occurrence of wrong temperatures, in particular overheating. The predetermined value that should not be exceeded by the angle between an axis perpendicular to the layers and the individual surface sections of the product contours is dependent on powder particle size, melting point, thermal capacity and thermal conductivity, and is approximately 45°, for example, for a CoCr powder with a particle size of 25 μm used for making dental parts.

The finish allowance may be configured, for example, with a wedge-shaped cross-section, because in this way it is possible to manufacture a product section with an area that slants strongly away from a less strongly slanted SLM manufacturing contour (or vice versa). The angle of the wedge-shaped finish allowance between the product contour and the SLM manufacturing contour will be all the greater, the more product contour is slanted. This results in a finish allowance that normally has a widening cross-section, thus leading to a wedge shape. However, straight lines are not typically predominant in the product contours, which are more likely to be irregular or arcuate in shape, so the cross-sectional wedge shape of the finish allowance will likewise have correspondingly irregular or arcuate contours.

A product section to be provided with a finish allowance in accordance with the invention is preferably a three-dimensional part of the product comprising a part of the external surface of the product. For example, a product section can be a contiguous part of the external surface of the product and have any shape, a strip or wedge of the product extending horizontally, for example, in relation to the manufacturing situation, or an annual portion of the product extending in the manufactured state at a specific height of the product.

In order to realize the angular correction of the external surface in a product section in accordance with the invention, it may be necessary that the finish allowance extends beyond the product section in which the angle between the perpendicular axis and the product contour exceeds the predetermined value and, if necessary, also includes product sections in which the angle between the perpendicular axis and the product contour does not exceed the predetermined value.

The allowance is preferably made as an overhang angle or minimum wall thickness in the contour profile. Product sections that are advantageously provided with an allowance are, for example, functional areas, fitting areas or overhangs.

A product may have several product sections that are each provided with a finish allowance in accordance with the invention, i.e. a product may have several finish allowances. When reference is made in the following to a finish allowance, the statements made apply also and equivalently for two or more finish allowances.

The method according to the invention has the advantage that the quality of the manufactured product is substantially improved, particularly in those regions in which the size of the area or the height of the product varies strongly, or where the contour of product sections is strongly slanted. Temperature compensation is improved by providing a finish allowance in these regions, so flaws resulting from insufficient temperature compensation, in particular overheating, can be reduced or prevented. This makes it possible to manufacture products with strongly slanted sections, thus preventing or reducing the risk of insufficient curing of material in some places and hence of insufficient product quality. In this way, it is also possible to simplify the manufacturing of the product in layers, since the temperature control requirements and hence the control of the energy input of a laser beam, for example, can be facilitated.

The invention is preferably developed by the step of adapting the geometrical data of the product for selectively curing predetermined zones of the applied layer in accordance with the finish allowance to be produced, in a step preceding steps (a) to (d).

In the method for manufacturing a product in layers, the geometrical data of the product to be manufactured, in particular the desired product contour, geometry and/or surface, are known in advance. These data are preferably analyzed before manufacturing in layers begins, i.e. before the first layer of a curable material is applied, to determine whether the product has product sections in which the angle between an axis perpendicular to the layers to be applied and at least one surface section of a contour of the product exceeds a predetermined value.

If such product sections are identified, it is preferred that the geometrical data of the SLM manufacturing contour be adjusted in such a way that the angle between the axis perpendicular to the layers and the external surface in this section does not exceed the predetermined value. It is particularly preferred in this connection that the zones in the individual layers to be cured are adjusted in such a way, more specifically by enlarging them, that adjacent layers, i.e., layers that are cured one after the other, project laterally to only a limited extent beyond the respective previously cured layer. This is done by adjusting the SLM manufacturing contour according to the invention in the respective zones in such a way, relative to the product geometry, that a new layer to be cured extends only by a specific allowance beyond the previously produced layer below it. The additional volume to be cured in the individual layers because of the finish allowance will be all the larger, the more strongly the product contour is slanted. The maximum range by which a layer to be newly cured should extend beyond a previously manufactured layer lying directly below it is chosen such that sufficient temperature compensation is possible between the new layer to be cured and the previously manufactured layer below it. Different slants can be realized, depending on the ratio between the powder particle size and the layer thickness. For example, for a CoCr powder used for making dental parts and having a particle size of 25 µm, the layer thickness is approximately 25-50 µm. In product sections which exceed the permissible angle of slant for the external surface, many layers must generally be provided with a finish allowance.

The geometrical data of the product are preferably adjusted in such a way that they are optimized for manufacturing in layers, for example with regard to minimum wall thicknesses, contour profiles or overhang angles.

The development according to the invention has the advantage that flaws such as product sections which are only partially cured are prevented, and that the process of applying layers, selectively curing them and removing the uncured material can be carried out as usual, since the change in geometry has been made beforehand.

The invention is preferably further developed by the step of removing the finish allowance, preferably by machining, in a subsequent step (e).

In order to obtain the desired product geometry, i.e., the SLM manufacturing contour minus the finish allowance, the product made layer by layer with a finish allowance is freed from the finish allowance after application of the layers. In some applications, it may also be preferred to remove only one or more parts of the finish allowance.

The finish allowance is preferably removed by machining, for example by milling, because this can ensure a high degree of dimensional accuracy and surface quality in conformity with product specifications. In the field of dental technology, the preferred method used is high-speed cutting (HSC), which excels with a high level of machining performance and high standards of surface quality.

The method according to the invention preferably combines the advantages of applying material in layers with those of machining, and ensures, firstly, that a high level of quality can be achieved in the manufactured product, also in the critical product sections, during layered application of material, and, secondly, that a high level of surface quality and dimensional accuracy can be achieved by the post-processing machining operations. The development according to the invention thus has the advantage that the high level of surface quality, contour accuracy and dimensional accuracy made possible by machining can also be achieved in precisely those product sections that it is very difficult or impossible to manufacture with such a high level of quality due to their complex product geometry and/or different surface configurations in successive layers of the product geometry when formed by applying material in layers.

The method according to the invention method is preferably developed by the steps of:
generating or providing geometrical data of the product for removing the finish allowance, in particular geometrical data of at least one surface section of a desired product contour, in a step preceding steps (a) to (d), and
transferring said data to a manufacturing device for removing the finish allowance.

By providing geometrical data for identifying the finish allowance to be removed, it is possible to remove the finish allowance efficiently and with high precision. Such data allow the product manufactured in layers and with a finish allowance to be processed in such a way that the product has the desired product contour, geometry or surface either in sections or in its entirety.

It is advantageous when these data are generated or provided before the product is manufactured in layers, i.e. before the first layer to be cured is applied. This is carried out advantageously with or after adjusting the geometrical data of the product for selective curing of predetermined zones of the applied layer according to the finish allowance to be produced according to claim 2. This has the advantage that the data processing, i.e., the generation, processing and adjustment of data, for example, can be carried out in a concentrated and efficient manner. It is further preferred that the geometrical data of the product for removing the finish allowance are transferred to a production device that is used to remove the finish allowance, in particular by machining, for example by milling.

Such a production device may be a high-speed cutter, for example. Said transfer of data has the advantage that the data can be centrally generated, provided and/or adjusted and have only to be transferred to the production device, without the production device also have to perform steps for generating or processing data.

The product manufactured in layers with a finish allowance is likewise transferred advantageously to said production device, so that both the required geometrical data and the product manufactured in layer with the finish allowance are present for removal of the finish allowance at the production device. The product manufactured in layer with a finish allowance is preferably transferred when the geometrical data are transferred. Depending on the respective applications, it may also be advantageous to transfer the product before or after transferring the geometrical data.

The geometrical data and/or the product manufactured in layers with a finish allowance are advantageously provided with a reference aid so that, firstly, the data can be clearly assigned to the product and vice versa, also and in particular after transfer of both the product and the data to the production device for removal of the finish allowance and, secondly, so that the position of the product in relation to the production device can be clearly determined, and hence that correct use of the data for removal of the finish allowance on the product can be ensured. The reference aid may be embodied, for example, as metadata assigned to the geometrical data. Another option is to define an area of the product as a reference area, for example, or to provide notches or abutments on the product.

Another aspect of the invention relates to a method of the kind initially specified or according to claim 1, characterized in that, in one, two or more product sections, a finish allowance embodied as an alignment and/or handling aid is applied in steps (a) and (b).

A finish allowance thus embodied can be used advantageously as a reference in order to determine clearly the position and/or alignment of the product. This is particularly advantageous when the product, after it has been manufactured in layers, is subjected to one or more steps of further processing, for example to remove finish allowances in other zones. Due to the fact that dental technology products are mostly individual, irregularly shaped single parts, determining the alignment and position of the product for further processing steps after manufacturing in layers, such as post-processing machining, is of great importance.

A finish allowance according to the invention which is embodied as an alignment and/or handling aid can also be used advantageously to facilitate transportation of the product between a number of successive processing stations by providing the alignment and/or handling with a grip portion with which the product can be simply and safely held or received. This has the advantage that, during transportation, there is no need to touch the product itself, which may have sensitive surfaces, but only the finish allowance which is later removed, which means that damage to the product by handling equipment can be avoided.

Another advantage of embodying a finish allowance as an alignment and/or handling aid when manufacturing the product in layers is that a uniform and/or standardized section can be created in this manner that can be used more easily by uniform and/or standardized alignment and/or handling equipment than products which are individually different.

It is also preferred when the finish allowance embodied as an alignment and/or handling aid has an individualization aid. This individualization aid can be used to identify the product unambiguously, in particular during transportation or in further processing steps, for example when specific data need to be assigned to a specific product. The individualization aid may be embodied as a notch or series of notches, for example.

The method according to the invention can be further developed in accordance with claim 6. Reference is made to the previous described developments of the method according to the invention for the advantages, embodiments and execution details of these developments.

Another aspect of the invention relates to a device for manufacturing a product by applying material in layers, comprising means for applying a layer of a curable material to a base plate and means for selectively curing predetermined zones of the applied layer on the basis of geometrical data of the product, characterized by data processing means configured to adapt the geometrical data of the product for selectively curing predetermined zones of the applied layers prior to application and curing of the layers, in such a way that a product manufactured on the basis of said data is provided during application and curing of the layers with a wedge-shaped finish allowance in one, two or more product sections in which an angle between an axis perpendicular to the layers and at least one surface section of a contour of the product exceeds a predetermined value, such that the angle between the axis perpendicular to the layers and the external surface in said product section does not exceed the predetermined value, and/or is provided in one, two or more product sections, during application and curing of the layers, with a finish allowance which is embodied as an alignment and/or handling aid, and, if necessary, means for generating or providing geometrical data of the product for the purpose of removing the finish allowance, in particular geometrical data of at least one surface section of a desired contour of the product and, if necessary, means for transferring the geometrical data of the product for the purpose of removing the finish allowance.

The invention also relates to a device arrangement for manufacturing a product by applying material partially in layers, said device arrangement comprising a first device for layered application of material to form a respective first partial volume of the product, comprising means for applying a layer of a curable material to a base plate and means for selectively curing predetermined zones of the applied layer on the basis of geometrical data of the product, characterized by a production device for removing a finishing allowance of the product.

The device arrangement according to the invention may be developed in accordance with claim 9.

Another aspect of the invention relates to the use of a device for layered construction of a product to perform the method of any one of the preceding claims 1 to 6 or in the device arrangement of any of the two preceding claims 8 and 9.

Figure 2:
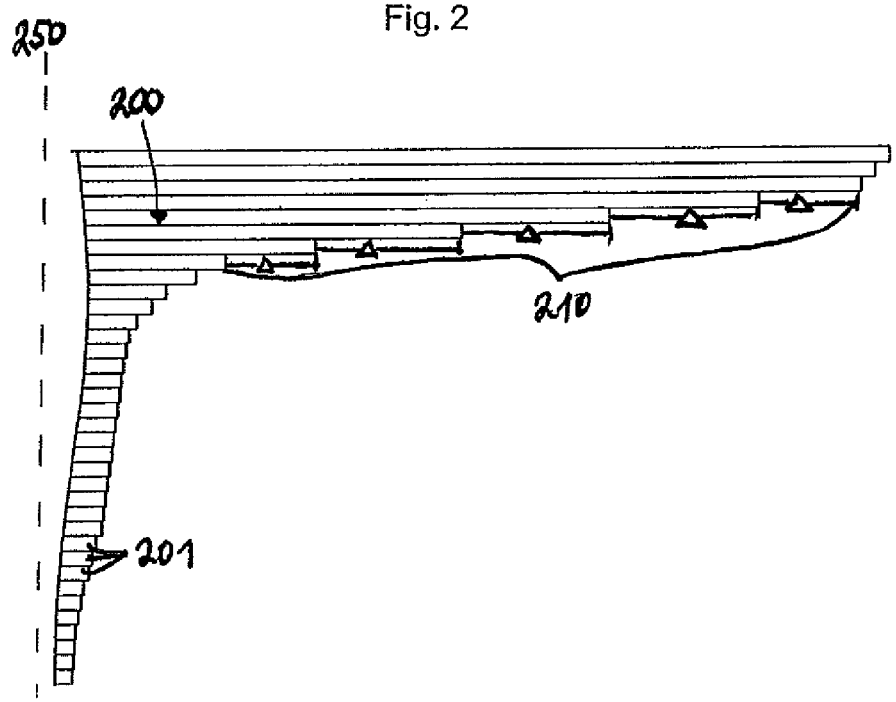
Figure 3:
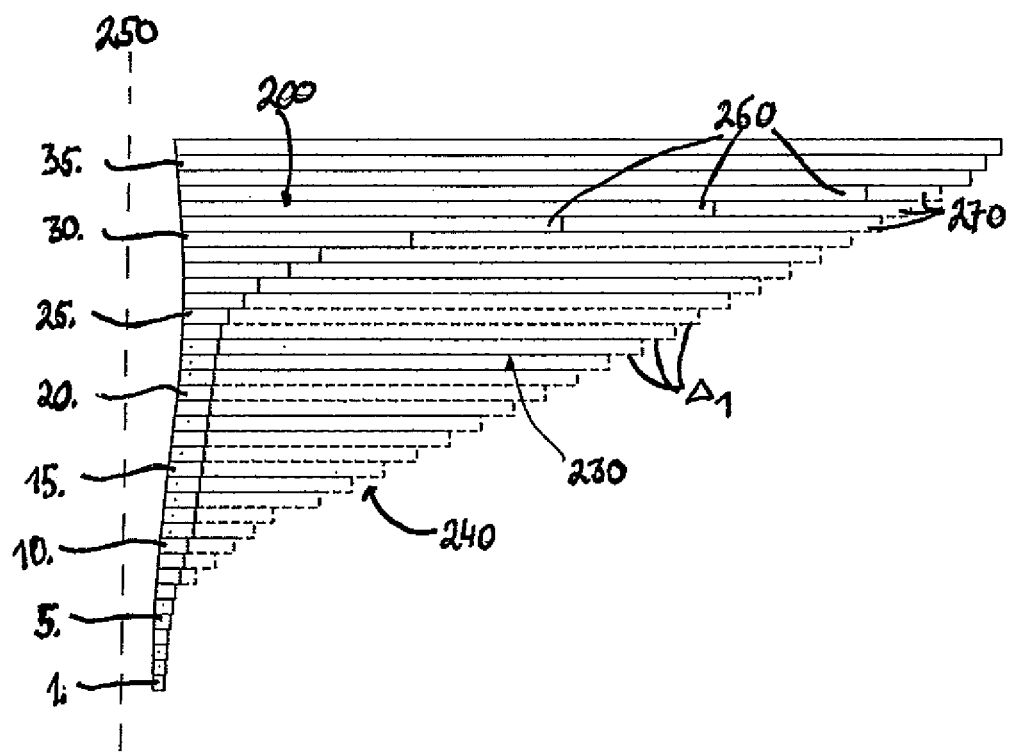
Figure 4:
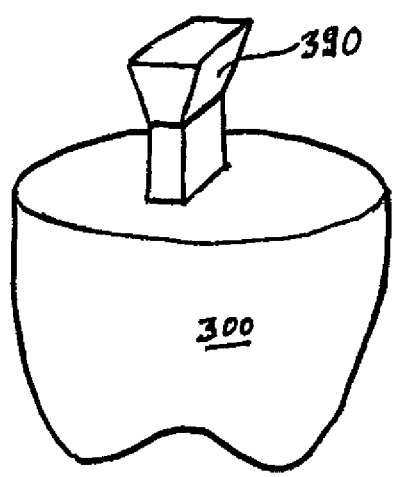

The invention shall now be described with reference to the attached Figures, in which:

FIG. 1: shows a schematic view of an axial section through a product manufacturing in layers, FIG. 2: shows a schematic view of an axial section of a product manufactured in layers, in which the layers are shown in enlarged and exaggerated form, FIG. 3: shows the section shown in FIG. 2, with a finish allowance, and FIG. 4: shows a product manufactured by applying material in layers, with a finish allowance embodied as an alignment and/or handling aid.

FIG. 1 shows a product 100 with a product contour 100a to be manufactured by applying material in layers. Product 100 has a product section 110 that is strongly slanted relative to an axis 150 perpendicular to the layers forming the product. A measure for the slant of product section 110 is the angle α between the perpendicular axis 150 and a tangent 111 to contour 100a in product section 110. In methods that do not conform to the invention, manufacturing product section 110 in layers involves the disadvantages referred to at the outset.

Another product section 120 has a substantially smaller slant, for example, as can be seen from the angle 13 between the perpendicular axis 150 and a tangent 121 to product section 120. When manufactured in layers, such a product section 120 does not exhibit the problems encountered with methods that do not conform to the invention, or does so to a minimal extent only.

With the method according to the invention, a finish allowance 130 is made that results in an angle γ being formed, between the external surface 140 and the perpendicular axis 150 in section 110 in the contour produced in layers, that is smaller than angle α and which does not exceed a predetermined value. This predetermined value is selected to allow sufficient temperature compensation between the layer being applied and the cured layer below it, so that no flaws ensue in the zone to be cured. The finish allowance extends beyond product section 110 in product 100 shown in FIG. 1.

FIG. 2 shows a product 200 manufactured in layers, in which a section 210 is likewise slanted in such a way relative to the a vertical axis 250 that the lateral overhang Δ of the layers above the respective preceding layer is so large that temperature compensation in these Δ zones is no longer sufficiently assured. FIG. 2 also shows clearly that the product contour of a product manufactured in layers is comprised of steps, with each step corresponding to one layer of cured material. However, the representation in FIG. 2 is not to scale, and the steps are greatly exaggerated. The contour or external surface of the product is therefore viewed as a smoothed line or surface across the steps.

The method according to the invention envisages reducing the size of the Δ zones in which the new layer to be cured projects laterally beyond the previously cured layer. To this end, a finish allowance 230 as shown in FIG. 3 is produced. To do this, it is firstly calculated in which zones a finish allowance is required and how the geometrical data of the product are to be adjusted in order to produce this finish allowance 230. The result of this data adjustment is that the individual layers are modified in their area, and more particularly that they are enlarged in area. These enlargements of the layers are shown in FIG. 3 by broken lines. As an example for three layers, the zones of the layers to be cured are shown by reference sign 260, and the additional zones to be cured in the layered contour formed after adjusting the geometrical data with a finish allowance are shown by reference sign 270.

The geometrical data of the first seven layers have not been adjusted. Beginning with layer 8, the zones to be cured in the layers of curable material have been successively enlarged so that the lateral overhangs of the layers produced by the method of the invention (designated with $\Delta_1$ for three layers by way of example) are substantially smaller than the overhangs Δ shown in FIG. 2. In this way, it is possible to ensure sufficient temperature compensation between the layer being cured and the layer below it.

After forming the layers with a finish allowance, the intermediate product manufactured in this way is forwarded to a production device for removal of the finish allowance, preferably by machining in a high-speed cutter. Data defining the finish allowance to be removed, and which are generated together with the adjustments to the geometrical data before the intermediate product is manufactured in layers, are likewise transferred to the production device so that a product with the desired contours can be manufactured by removing the finish allowance.

FIG. 4 shows an intermediate product 300 manufactured in layers, with a finish allowance 390 embodied as an alignment and/or handling aid. As has also been described with reference to FIGS. 1 to 3, finish allowance 390 is produced by adjusting the geometrical data for selective curing of predetermined zones of the applied layer before the layers are applied. The alignment and/or handling aid can be used to transport the intermediate product without damaging the relevant outer contours, and also to determine unambiguously the position and/or alignment of the intermediate product in post-processing steps.

Like the finish allowances 130, 230 described with reference to FIGS. 1 to 3, the finish allowance 390 of intermediate product 300 is preferably removed again by machining, for which purpose the respective data for removing finish allowance 390 are preferably generated before application of the first layer of a curable material begins, and likewise forwarded before, with or after transfer of intermediate product 300 to a production device for machining.

The invention claimed is:

1. A method for manufacturing a dental product in layers, said method comprising the following steps:
    (a) applying a layer of a curable material;
    (b) selectively curing predetermined zones of the applied layer on the basis of geometrical data of the product;
    (c) repeating steps (a) and (b) until a geometry of the product has been created in the form of cured material;
    (d) removing the uncured material, to produce an intermediate product, wherein in one, two or more product sections in which an angle (α) between an axis perpendicular to the layers and at least one planar section of a contour of the product exceeds a predetermined value, a finish allowance is applied in steps (a) and (b) to said planar section in such a way that the angle (β) between the axis perpendicular to the layers and the external surface in said product section does not exceed said predetermined value at the intermediate product, wherein geometrical data of the product for removing the finish allowance is generated in a step preceding steps (a) to (d);
    e) transmitting the geometrical data to a manufacturing device for removal of the finish allowance;
    f) forwarding the intermediate product to the manufacturing device after all layers on the intermediate product are formed; and
    g) removing the finish allowance, in a subsequent step or steps, in the manufacturing device using said geometrical data so as to produce the dental product with heavily inclined surfaces.

2. The method of claim 1, further comprising:
    adapting the geometrical data of the product for selectively curing predetermined zones of the applied layer in accordance with the finish allowance to be produced, in a step preceding steps (a) to (d).

3. The method of claim 1, wherein the finish allowance is removed by machining.

4. The method of claim 1, wherein in one, two or more product sections, a finish allowance embodied as an alignment and handling aid is applied in steps (a) and (b); and wherein after forming all the layers the intermediate product is forwarded to the manufacturing device by gripping the handling aid.

5. The method of claim 4, wherein the method is developed according to claim 2.

6. The method of claim 1, wherein the finish allowance comprises a wedge-shaped cross-section.

7. The method of claim 1, wherein the geometrical data of the product comprises at least one planar section of a desired product contour.

8. A method for manufacturing a product in layers, said method comprising the following steps:
    (a) applying a layer of a curable material;
    (b) selectively curing predetermined zones of the applied layer on the basis of geometrical data of the product;
    (c) repeating steps (a) and (b) until a geometry of the product has been created in the form of cured material; and
    (d) removing the uncured material to produce an intermediate product;
    wherein in one, two or more product sections in which an angle (α) between an axis perpendicular to the layers and at least one planar section of a contour of the product exceeds a predetermined value, a finish allowance is applied in steps (a) and (b) to said planar section in such a way that the angle (β) between the axis perpendicular to the layers and the external surface in said product section does not exceed said predetermined value at said intermediate product, wherein the finish allowance comprises a wedge-shaped cross-section across all the layers prior to removing the finish allowance in a subsequent step, wherein in said one, two or more product sections, a finish allowance embodied as an alignment and handling aid is applied in steps (a) and (b)

(e) generating geometrical data of the product for removing said finish allowance in a step preceding steps (a) to (d);

(f) transmitting said geometrical data to a manufacturing device for removal of said finish allowance; and (g) forwarding said intermediate product to said manufacturing device, after all layers are formed, by gripping said product with said handling aid, wherein the position of the product in said manufacturing device is determined using said finish allowance as a reference.

9. A method for manufacturing a product in layers, said method comprising the following steps:

(a) applying a layer of a curable material;

(b) selectively curing predetermined zones of the applied layer on the basis of geometrical data of the product;

(c) repeating steps (a) and (b) until the geometry of the product has been created in the form of cured material;

(d) removing the uncured material to produce an intermediate product wherein in one, two or more product sections in which an angle ($\alpha$) between an axis perpendicular to the layers and at least one planar section of a contour of the product exceeds a predetermined value, a finish allowance is applied in steps (a) and (b) to said planar section in such a way that the angle ($\beta$) between the axis perpendicular to the layers and the external surface in said product section does not exceed said predetermined value at the intermediate product, wherein in one, two or more product sections, a finish allowance embodied as an alignment and handling aid is applied in steps (a) and (b);

e) forwarding said intermediate product, after forming all layers, to a manufacturing device for removal of the finish allowance by gripping said handling aid, wherein the position of the product in the manufacturing device is determined using the finish allowance as a reference; and f) removing the finish allowance in the manufacturing device.

* * * * *